Patented Oct. 26, 1948

2,452,313

UNITED STATES PATENT OFFICE 2,452,313

PLASTICIZED PROLAMINE-BASE PROTEIN COMPOSITIONS

Willard L. Morgan, Columbus, and Carl R. Faelten, Clinton Township, Franklin County, Ohio, assignors, by direct and mesne assignments, to American Maize-Products Company, a corporation of Maine No Drawing. Application March 5, 1945, Serial No. 581,188

19 Claims. (Cl. 106—153)

This invention relates to novel plasticizers for prolamines and "prolamine-base" compositions, and to the resultant plasticized compositions. More particularly, there are described plastic compositions, methods of forming such compositions and articles thereby secured, in which prolamines such as zein, corn protein or other cereal prolamines or their derivative proteins are plasticized by amides substituted upon the nitrogen atom and further characterized by the presence of one or more amino groups occurring in the one or more substituent groups on the nitrogen atom. In such manner there may be used N-aminoethylbenzoic-amide, N-aminoethyloleic-amide, and other aminated nitrogen substituted alkylated amides.

It is an object of this invention to provide novel plasticized compositions of "prolamine-base" proteins.

It is another object of this invention to provide novel prolamine compositions with plasticizers exhibiting highly desirable compatibility and solvency for the prolamines, which permits the preparation directly of plastic masses, coatings and films with the prolamines.

It is a still further object of this invention to provide novel prolamine compositions having plasticizers for prolamines of improved compatibility characteristics which compositions may be applied in solvents as adhesives or coatings, or thus applied in forming films or plastics.

Other and ancillary objects of this invention will be apparent from the detailed description and examples thereof hereinbelow set forth.

The prolamines have long been established as exhibiting certain properties unique among the proteins, and as such have been classified by workers dealing with proteins as a separate group thereof. By such classification the prolamines are those proteins characterized by solubility in aqueous ethyl alcohol. They are found only in cereal grains and, contrasted to other proteins, are high in the amino acid proline and amide nitrogen content, and are deficient in free amino groups and in lysine. They are very nearly or entirely insoluble in water and weak aqueous acid solutions, but are freely soluble in dilute alkali solutions in water.

Although in the following description and examples reference shall be made to the particular prolamine zein which is derived from corn, it is to be understood that this invention is equally applicable to the other prolamines, that is, to hordein, derived from barley; to kafirin, derived from sorghum; to gliadin, which is derived from wheat; and to the cereal glutens generally.

The diverse and potentially large-scale utilization of plasticized prolamine compositions has long been attractive, and the discovery of satisfactory plasticizers for the prolamines in general, and, in particular, for the prolamine zein which is of industrial importance, has been the object of extensive investigation. Various plasticizers for this purpose have been proposed, but most of such prior art materials have exhibited low plasticizing activity or undesirable characteristics such as incomplete compatibility, high melting point, strong odors, water solubility or rapid loss by volatilization from the prolamine, thereby, and in other ways, resulting in compositions which are unsatisfactory commercially in one respect or another.

It has been proposed to plasticize certain proteins with the simple amides, such as formamide and acetamide. Trials of these as prolamine plasticizers have not been attractive and have not lead to any particular use in such application due to various disadvantages. Thus, for example, the formamide evaporates out of such compositions rather readily and the acetamide crystallizes very quickly, in either case leading rapidly to brittle products or compositions of fugitive flexibility. These lower amides are also extremely soluble in water which further limits their utility as plasticizers for the prolamines. The higher members of the simple amide series, such as stearic amide and the like, exhibit negligible if any compatibility and plasticizing activity for the prolamines and they rapidly tend to crystallize out and sweat out from prolamine compositions in which they are incorporated. By the employment of the substituted aminated alkylated amides set out in this invention we have been able to secure highly satisfactory plasticized prolamine compositions.

In this invention there is set forth the surprising discovery that organic amides substituted upon the nitrogen atom by one or more alkyl groups carrying one or more amino radicals function as remarkably effective plasticizers for the prolamines. It has been found that the introduction of an amino group into amides in the way set forth has produced very effective plasticizers which generally are odorless, high-boiling liquids which show the further highly desirable result that as good solvents for the prolamines they have no tendency to crystallize out of the plastic compositions and the flexibility secured in such compositions is of useful nature for long periods of service. Furthermore, most of the compounds show a highly desirable low solubility in water and good solubility in prolamine solvents such as alcohol.

Generally speaking, the substituted aminated alkylated carboxylic amides which we have found to be effective plasticizers for prolamines may be represented by the general formula RCONR''R' wherein R represents an organic radical of any nature, such as an alkyl or aromatic group, a cycloalkyl or heterocyclic radical, or it may be derived from a terpene acid or a natural resin acid. R' represents an alkyl organic grouping and it must carry an amino group or groups. The amino groups may be either primary (=NH) or secondary (—NH) amino groups. R'' may represent either hydrogen or organic groupings of similar or unlike nature with respect to R or R' and it may or it may not carry attached to it an amino group or groups. When R'' is hydrogen the general formula becomes more specific and is RCONHR'. C, O, N and H represent carbon, oxygen, nitrogen and hydrogen, respectively. It will be seen that it is characteristic of the compounds set forth as plasticizers that there is a substituent organic group or groups attached directly to the nitrogen and that these groups replace the hydrogens normally attached to the nitrogen in simple amides of the formula RCONH$_2$ and that further the N-substitutent groups are peculiar in that at least one of them carries an amino group or groups.

As preferred compounds we employ as plasticizers in the plasticized prolamine compositions produced under this invention aminated substituted amides in which the total number of carbon atoms in such organic molecule is less than 24 carbon atoms as we find that the activity as a solvent and as a plasticizer for prolamines generally decreases as the total number of carbon atoms in such a molecule is increased. It will be apparent, however, from the examples set forth that frequently compounds having more than this number of carbon atoms exhibit desirable activity either in plasticizing or in otherwise modifying the nature of prolamine plastics. It will be further apparent that the water-insolubility and boiling point will vary somewhat with the molecular size of the compound but these properties are generally highly satisfactory. Where high water solubility and high boiling points are both desired as in coatings applied from water solutions, we find either the compounds made with relatively few carbon atoms or the compounds made with multiple numbers of amino groups present to be directly of interest. It will be apparent that the water solubility and boiling point, as well as the direct compatibility and solvency for prolamines will thus vary with the molecular size of the compound and to some degree with respect to the relationships of the elements just stated.

Generally the activity of the compounds as solvents and plasticizers for prolamines is increased as is also the boiling point as the number of amino groups is increased, although the presence of more than one amino group generally leads to increased water solubility as above stated. It has also been found frequently advantageous to have present hydroxyl groups in the aminated substituted amides of the present invention. However, such substitution also concurrently results in increased water solubility of the plasticizer and for this reason it may be undesirable to have present in the aminated substituted amides a total of more than one hydroxyl, phenolic hydroxyl and amino groups for every three carbon atoms therein. The presence of ether groups in the plasticizers of the present invention is also generally found to enhance compatibility characteristics and the activity of our materials as plasticizers for prolamines. Unstauration in the aminated substituted amide plasticizers has been found in general to result in compounds which are more readily compatible with the prolamines and hence to increase plasticizing activity. When a branched-chain group is present we have found that in general the greater the length or the more complex the branched nature of such chain, the harder the plasticized prolamine composition for any given amount of plasticizer. The aminated substituted amides may also carry organic groupings having ester linkages, ketone groups or halogens but generally the presence of these groups has been found not to improve the plasticizing activity but often to be slightly adverse in giving somewhat poorer solvent effects and compatibility.

The following are typical of some of the various aminated nitrogen substituted amides hereinabove described which have been found eminentl satisfactory in the presence of the present i vention. In each of these an amino group w _ be found in the group substituted upon the nitrogen in the amide group.

N-aminoethyl-oleamide
$C_{17}H_{33}CONHC_2H_4NH_2$

N-aminoethyl-ethoxyacetamide
$C_2H_5OCH_2CONHC_2H_4NH_2$

N-aminoethyl-2-ethylhexanamide
$(C_4H_9)(C_2H_5)CH—CONHC_2H_4NH_2$

N-aminoethyl-lauramide
$C_{11}H_{23}CONHC_2H_4NH_2$

N-aminoethyl-stearamide
$C_{17}H_{35}CONHC_2H_4NH_2$

N-aminoethyl-ricinolamide
$C_{17}H_{32}(OH)CONHC_2H_4NH_2$

N,N'-di(aminoethyl)sebacamide
$NH_2C_2H_4HNOC(CH_2)_8CONHC_2H_4NH_2$

N-aminoethyl-phenylacetamide
$C_6H_5CH_2CONHC_2H_4NH_2$

N-diaminodiethylene-levulinamide
$CH_3COCH_2CH_2CONHC_2H_4NHC_2H_4NH_2$

N-diaminodiethylene-benzamide
$C_6H_5CONHC_2H_4NHC_2H_4NH_2$

N-diaminodiethylene-undecylenamide
$CH_2=CH(CH_2)_9CONHC_2H_4NHC_2H_4NH_2$

N-diaminodiethylene-lauramide
$C_{11}H_{23}CONHC_2H_4NHC_2H_4NH_2$

N-diaminodiethylene-oleamide
$C_{17}H_{33}CONHC_2H_4NHC_2H_4NH_2$

N-diaminodiethylene-stearamide
$C_{17}H_{35}CONHC_2H_4NHC_2H_4NH_2$

N-diaminodiethylene-abietamide
$C_{19}H_{29}CONHC_2H_4NHC_2H_4NH_2$

N-diaminodiethylene-congo-copal-amides

N-triaminotriethylene-acetamide
$CH_3CONHC_2H_4NHC_2H_4NHC_2H_4NH_2$

N-triaminotriethylene-levulinamide
$CH_3COCH_2CH_2CONHC_2H_4NHC_2H_4NHC_2H_4NH_2$ N-triaminotriethylene-lauramide
$C_{11}H_{23}CONHC_2H_4NHC_2H_4NHC_2H_4NH_2$ N-triaminotriethylene-ricinolamide
$C_{17}H_{32}(OH)CONHC_2H_4NHC_2H_4NHC_2H_4NH_2$ N-tetraminotetraethylene-ricinolamide
$C_{17}H_{32}(OH)CONHC_2H_4NHC_2H_4NHC_2H_4NHC_2H_4NH_2$ N-tetraminotetraethylene-stearamide
$C_{17}H_{35}CONHC_2H_4NHC_2H_4NHC_2H_4NHC_2H_4NH_2$ N-aminohexyl-propanamide
$C_2H_5CONHC_6H_{12}NH_2$ N-aminohexyl-2-ethylbutanamide
$(C_2H_5)_2CHCONHC_6H_{12}NH_2$ N-aminohexyl-salicylamide
$HOC_6H_4CONHC_6H_{12}NH_2$ N-hydroxyethylamino-ethyl-lauramide
$C_{11}H_{23}CONHC_2H_4NHC_2H_4OH$

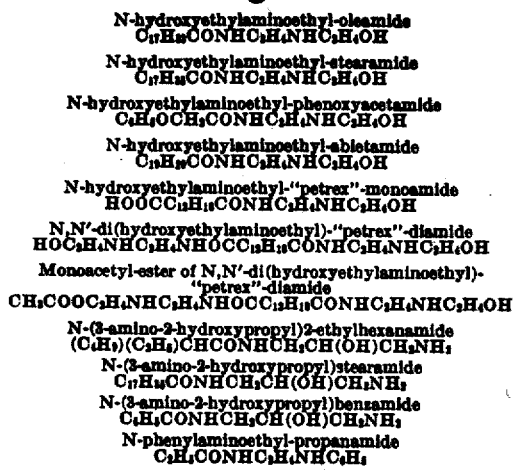

The nitrogen substituted amides carrying amino groups in the group substituted upon the nitrogen which we have found useful as prolamine plasticizers, may be made by various means. One way in which this may be accomplished is to heat together quantities in proportion to the molecular weights of organic acids which donate the acyl group carrying the radical R and amines containing 2 or more amino groups, as for example, ethylenediamine, diethylenetriamine, tetraethylenepentamine, hydroxyethyl-ethylene-diamine, 2-hydroxyl-1-3-diaminopropane, amino-ethyl-aniline, or other similar amines. The materials readily react when heated to temperatures up to 160° C., with elimination of water with direct formation of the desired substituted amides. Primary or secondary amines readily give this type of reaction. In reacting the resinous acids or natural resins sufficient amine is taken to be equivalent to the acid equivalents of the natural resins as determined by a preliminary analysis. In such manner, the copal and mastic amides are readily prepared. These and the amides made from rosin or abietic acid as well as those made from the terpineol maleic anhydride resinous dibasic condensation acid sold by Hercules Powder Company, Wilmington, Delaware, as "Petrex," are particularly interesting an aminated substituted amides because of their resinous and frequently semi-fluid nature and their ready solubility in alcohol in which prolamine plastic coating compositions are frequently prepared. Petrex normally shows an acid number of 530 and is di-basic. Abietic acid is mono-basic and has an acid number of 185, and commercial grades of rosin range in acid number between 150 and 175. "Vinsol," which is more particularly described in U. S. Patent to Hunter No. 2,276,304, shows an acid number of approximately 93 and the congo copal gums range in acid number between 94 and 123 while the gum mastic ranges in acid number from 50 to 70.

Mixtures of the aminated substituted amides combined in any proportions whatever with each other constitute effective prolamine plasticizers. The aminated substituted amides may also be employed as plasticizers in prolamine plastics in combination with other known plasticizers such as dibutyl tartrate or para-toluene-sulfonamide. The amount of plasticizer which may effectively be incorporated with the prolamine to result in a useful, plasticized composition occupies an extremely broad range of percentages based on total product composition, and the amount employed will depend upon the properties desired in the plastic to be produced. For example, if 5 percent (by weight of the resultant composition) of aminated substituted amide plasticizer be incorporated with, say, the prolamine zein, the plasticized product is hard and tough in character. When on the other hand, increasingly greater percentages of plasticizer are incorporated with the zein, the resultant compositions exhibit increased flexibility and softness such that at a content of 50 percent by weight in the product the plastics often resemble many rubber articles. When 80 to 95 percent by weight of the resultant composition is plasticizer, the products are permanently soft and tacky. Fundamental product characteristics may be regarded, then, as a function of plasticizer content, and it therefore follows that the amount of plasticizer to be incorporated with a prolamine will be determined by the use to which the product is to be put. Further, it is apparent that not all of the aminated substituted amides are of equal effectiveness as already pointed out and by suitable choice of such amide more or less harder plasticized prolamine compositions may be made with a given amount of plasticizer, depending upon which plasticizer is employed. It is evident, then, that a wide range of plasticized compositions is obtainable by means of this discovery, and, further, that product characteristics may be modified at will by judicious choice of the quantity of plasticizer incorporated with the prolamine.

The plasticized compositions resulting from practice of this invention have been found of versatile utilities not only as plastic rods, sheets and molded articles, but also as coatings of various types. Thus, for example, these compositions may be made into solutions and applied as a sizing; utilized for impregnating and coating, particularly for grease and water-proofing purposes, and applied to the production of flexible films, lacquers, wall and floor paints, deck enamels, grease and moisture-proof lacquers for application to metallic surfaces, protective varnishes for printed and other paper surfaces, adhesives, laminated products of various types, plastic compositions, linoleum, oilcloth, and the like. These uses are, of course, cited as being illustrative only of the diverse applications of the novel compositions, and as in no way imposing limitations thereon, there being many related and other uses which will at once be apparent to those skilled in such arts.

In practicing this invention, the optimum quantities of plasticizer to be incorporated to secure the qualities desired for the use to which the resultant composition is to be put, will at once be apparent to those skilled in the respective arts from the further description and examples hereinafter set forth.

As a general procedure, the prolamine and plasticizer may be thoroughly mixed in the desired proportions at room temperature. The mixture may then be heated and maintained at a more or less elevated temperature until homogeneity has been attained, as evidenced by disappearance of the prolamine and plasticizer as individual entities with consequent formation of a single, homogeneous mass. This may be carried out in internal mixing machines or upon plastic milling rolls. Pigments, dyes, fillers, resins and the like may be added to the masses while in these machines. Upon cooling to room temperatures, the plasticized composition will be more or less hard and pliable, depending upon the amount and nature of plasticizer incorporated therein, as hereinabove set forth. In the incorporation of other materials with plasticized prolamine compositions for the production of lacquers, sizing, coating or impregnating materials, printing inks, adhesives, or the like, it is frequently advantageous to mix all of the individual components thereof including solvents at the outset of operations, rather than to plasticize the prolamine preliminarily and thereafter to incorporate the plasticized product with the other compounding materials, although such may be done. However the sequence of such operations is not at all critical, and in general will be governed by the character of the technical operations involved, by the arrangement thereof which results in optimum process economies, and by the established production methods conventionally practiced in each particular industry.

As hereinabove set forth, the plasticizers of the present invention may be employed, alone or in conjunction with other known plasticizers, for various plastic modified prolamine compositions, such as, for example, aldehyde reacted prolamine plastics. It is well known to react prolamines with aldehydes, particularly formaldehyde, to form solutions, coatings, and thermosetting plastic compositions of improved water resistance and widely varying properties depending upon the nature and amount of ingredients incorporated therein, and upon the temperature and duration of aldehyde reaction. If desired, the plasticized prolamine compositions of this invention may be aldehyde-cured according to conventional techniques, to result in useful plastics and coating compositions which, after curing, are no longer thermoplastic, but are thermosetting in nature, and by reason of the plasticizers set forth in the present invention are flexible and tough. It is apparent that while aldehyde curing operations with plastics and coatings are preferably carried out upon conclusion of plasticization of the prolamine material, it is possible to add the plasticizers to solutions of prolamines which have been first reacted with the aldehydes.

As is well known, the prolamines are a group of proteins characterized by solubility in aqueous alcohol solutions which are found only in certain cereal grains. The well-known prolamines include zein, found in corn, gliadin, found in wheat, hordein, found in barley, secalin from rye, sorghumin from sorghum, and the alcohol-soluble protein extractable from oats. The prolamines constitute a large portion of the protein found in the starchy or endosperm parts of the cereal grains and the proteins are isolated from such starchy portions after the grains have been degerminated, as for example in cornstarch manufacture by the wet-milling process or in the manufacture of wheat or other flours by the dry-milling process. The starches may be removed by mechanical washing action as in the preparation of wheat gluten, by wet kneading of the floury mixture, or they may be removed as in the commercial separation of cornstarch. The protein concentrates thus secured may then be extracted by aqueous alcohol or otherwise treated to produce concentrated or purified alcohol-soluble prolamines as is well known in the art for producing zein and gliadin. These various prolamines may be used to manufacture prolamine compositions and plastic products and be cured with formaldehyde. Certain modifications of the prolamines have become available, such as for instance zein acetate, or zein modified by heat and water-vapor or water treatment; these may be plasticized with the compounds of the present invention and when compositions or plastics are formed of these with aldehydes the resultant compositions may likewise be plasticized with the aminated substituted amide of this invention.

Prolamine plastic compositions may also be formed from the crude protein concentrates derived directly from the degerminated cereals when these contain a considerable proportion of a prolamine. Thus, as a suitable corn protein for forming plastics, there may be used the corn gluten resulting from the commercial separation of cornstarch in the wet-milling process, which may contain from 40 percent to 65 percent of corn proteins primarily of prolamine nature, a large part being the alcohol-soluble prolamine zein. The non-protein remainder of the gluten consists primarily of starch with small quantities of cellulosic bodies and fatty substances. Partially purified corn glutens such as those produced in Shildneck Patent U. S. No. 2,274,004 by further removal of starch with acids or as shown in Schopmeyer Patent U. S. No. 2,310,104, wherein fatty materials are removed and which contain 60 percent to 100 percent protein content, can obviously be used in making cured corn protein compositions and plastics and aldehyde cured products, which may be further modified with the plasticizers of the present invention. It will be understood that as the term "prolamine-base" protein is used in the description here given and in the appended claims, there is included by such term not alone the purified prolamines isolated from the various cereal grains, but also cereal protein products and mixtures of cereal proteins produced from the endosperm which contain a considerable proportion of prolamine, and there is also included by such term modified or chemically altered prolamines and aldehyde cured prolamine products.

The following examples will serve to illustrate, to a more or less limited extent, the scope of the present invention, and the presently more important practical applications thereof. It is to be explicitly understood that the present invention is in no way limited to the applications thereof set forth in these examples, nor to the particular ingredients or to the amounts therein specified, since equivalent ingredients in varying percentages may be used for these and other applications, as will be readily apparent to those skilled in such arts. Thus, for instance, in those examples in which individual solvents or solvent mixtures are employed, it will be understood that any solvent or solvent mixture exhibiting solvency for the prolamine and for the plasticizer will function adequately as a mutual solvent for the unplasticized and for the plasticized prolamine materials. Thus, for example, ethylene glycol monomethyl ether, aqueous ethyl alcohol, aqueous isopropyl alcohol, aqueous diacetone alcohol, diethylene glycol monoethyl ether, and diethylene glycol monomethyl ether, are individually solvents both for zein and for the plasticizers used in this invention, and therefore function, either separately or in combination, as solvents for both unplasticized and plasticized prolamine materials. Other solvents such as toluene may be added in certain amounts to such solvent mixtures for certain desirable purposes functioning as auxiliary solvents of which many are known in the prolamine solvent field.

*Example 1*

By weight seventy parts of zein and 20 parts of waxy N - (3 - amino-2-hydroxypropyl) stearamide and 10 parts of the resinous N-hydroxy-ethylamino-ethyl-abietamide were placed in a warm jacketed internal plastic mixer of the dough type used in the rubber industry. N-(3-amino-2-hydroxypropyl) stearamide melts at about 80° C. The agitated mix was then heated to a temperature not exceeding 130° C., and maintained at a temperature in the general range 100° to 130° C., for a period of about 60 minutes, at which time plasticization of the zein had already been substantially completed as evidenced by disappearance of the zein and plasticizers as separate entities resulting in a uniform homogeneous plastic solution. Upon cooling to room temperature this product was found to be clear, transparent, substantially colorless and uniform when viewed in thin sections. It was a thermoplastic composition, which could when again heated be extruded and molded into formed plastic articles, such as plastic tubes, doorknobs, toys, and the like. These plastic articles were essentially odorless and tough and could be deformed and fractured only with difficulty.

Example 2

By weight 20 parts of liquid N-aminoethyl-ricinolamide, 10 parts monobutylphathalate, and 10 parts of lauric acid were thoroughly mixed with slight warming. The resultant mixture was then heated in a jacketed mixer to a temperature in the general range 120° C. to 135° C., while 60 parts of zein was gradually mixed in during the course of an hour. The plastic dough was further worked for a period of about 20 minutes, at which time a clear, homogeneous plastic solid solution had resulted and plasticization of the zein was substantially complete. Upon cooling a small portion to room temperature the product was found to be a clear, homogeneous, substantially transparent and colorless thermoplastic composition, relatively tough, and pliable at ordinary temperatures, and thus directly usable as a plastic. When cooled to below 70° C., there was incorporated in the main plastic batch 30 parts by weight of resinous N,N'-di(hydroxyethylamino-ethyl) "petrex"-diamide and thereafter 5 parts of trioxymethylene. The batch was then sheeted on rubber-sheeting rolls and pieces were inserted into a mold of a suitable shape and were then pressed in a heated press at 250 lbs. per square inch at 135° C. for one-half hour. This gave plastic articles generally similar to those produced by Example 1 but distinguished therefrom by not being thermoplastic and by having greater water-resistance.

Example 3

A rubber-like plastic suitable for use as a shoe-sole was made by mixing in an internal mixer the following ingredients:

| | Parts by weight |
|---|---|
| Zein | 37 |
| Dibutyltartrate | 29.5 |
| N-aminoethyl-oleamide | 15.0 |
| Trioxymethylene | 5 |
| Clay | 12 |
| Carbon Black | 5 |

The zein and plasticizers were first entered into the internal mixer and after working for approximately one hour the pigments were added in small portions at a time so as to provide a homogeneous mixture. The working of the mass readily provides heat, and it was then cooled to below 80° C., by a water-cooled jacket upon the internal mixer. Thereafter the trioxymethylene was quickly introduced and milled in during a short period of time of five minutes or less. The plastic mass was then removed from the internal mixer and sheeted out upon a rubber milling roll and portions of the thermoplastic uncured sheet were then placed within an ordinary shoe sole mold such as is used in the rubber trade. Curing was then carried out by heating such mold to 130° C. for one-half hour under a hydraulic pressure of 100 to 500 lbs. per square inch. Such pressures have been found suitable in the manufacture of plastics from prolamines. The product was tough and flexible and in general had qualities similar to ordinary rubber shoesoles.

Example 4

As an example wherein there is employed a crude mixture of cereal proteins containing prolamines, hard prolamine plastic articles such as door knobs of a black color were made by molding under conditions similar to those used in Example 3 masses of the following plastic mixture:

| | Parts by weight |
|---|---|
| Corn gluten, 60% protein content | 40 |
| Nevillac 10° (coumarone-indene-phenol-resin, Neville Co., Pittsburgh)[1] | 30 |
| N-phenylaminoethyl-propanamide | 15 |
| Asbestine | 8 |
| Channel Black | 5 |
| Trioxymethylene | 2 |

[1] Composition unknown, except that it is one or more condensation products of paracoumarone, indene, or coal tar cuts rich in these, with phenol, generally with sulfuric acid as a catalyst.

In making the plastic mixture the plasticizers, resin and gluten were first mixed in a plastic masticating machine. The pigments were then incorporated by adding small portions at a time and the mass worked until it was thoroughly uniform. While still in the plastic machine, the mass was then cooled to 75° C., and the trioxymethylene quickly introduced. After further working for approximately five minutes to distribute the formaldehyde compound uniformly throughout the mass it was removed from the mixer and sheeted in milling rolls prior to actual molding operations at temperatures above 120° C.

Example 5

By weight 40 parts of zein, 30 parts of N-aminohexyl-2-ethyl-butanamide, 20 parts of dibutyl-tartrate and 10 parts of oleic acid were dissolved at room temperature in a solvent mixture comprised of about 30 parts by weight of methyl-Cellosolve and about 70 parts by weight of 95% (by volume) ethyl alcohol. The resulting solution was found to be directly applicable for many uses; for example, for sizing, coating, impregnating and water-proofing textiles, paper, wood, tinplate and the like. As a coating material, the solution was eminently suited for application to varnished, lacquered, and the like surfaces. Further, it was found to form removable, strong, tough, pliable, transparent films when cast upon an oiled or waxed glass surface. In addition to these properties, the films were oil-resistant, hard and non-tacky in nature, and furnished an excellent surface for printing purposes. When applied to paper there resulted excellent grease- and moisture-proof coatings, giving flexible wrappings suitable for foodstuff packaging. Coated upon tinplate the coating was found to withstand can-forming operations and repeated flexing without cracking. The coating was excellent in grease resistance.

Example 6

By weight twenty parts of cereal gluten derived from corn, 20 parts of liquid N-diaminodiethylene-undecylenamide, 30 parts of tetraethyleneglycol, and 25 parts of carbon black were thoroughly ground together on a roller mill. The resultant product was found to be suited for use as an ink for printing cotton bags.

Example 7

By weight 47 parts of zein, 35 parts of undecanoic acid, 15 parts of N-hydroxyethylaminoethyl-phenoxy-acetamide, 90 parts of clay, 10 parts of basic lead carbonate, and about 50 parts by weight of 80% (by volume) aqueous ethyl alcohol and 15 parts ethyl lactate were thoroughly mixed and ground in a ball mill for a period of about 24 hours. The resultant composition was knife-coated onto a sized sheeting base, which was then force-dried for about 1 hour at a temperature of about 150° F. The resultant oil-cloth base product exhibited excellent wearing qualities, resistance to flexing and to the action of water, acids, and greases. The nitrogen substituted amide plasticizers of the present invention offer the advantage that they may be employed with most all types of pigments including the basic reactive ones such as zinc oxide, lithopones, zinc sulfide, and lead carbonates.

Example 8

By weight 95 parts of zein, 5 parts of N-aminoethyl phenylacetamide, 0.1 part of oil soluble dyestuff Yellow OB, and about 240 parts of a solvent mixture consisting of 80 parts by weight of diacetone alcohol and 160 parts by weight of 95% (by volume) ethyl alcohol were mixed together overnight in a ball mill. The product was a shellac substitute eminently suited for coating wooden surfaces.

Example 9

By weight 75 parts of gliadin and 25 parts of liquid N-tetraminoteteraethylene - ricinolamide were thoroughly mixed at room temperature. The resultant mixture was heated to a temperature of about 127° C., and maintained at a temperature in the general range 120° C., to 135° C., for a period of about 35 minutes, at which time a clear, homogeneous solution indicating complete plasticization of the gliadin had resulted. Upon cooling to room temperature a clear, transparent, substantially colorless, thermoplastic product resulted. When dissolved at room temperature in a volatile solvent mixture consisting of about 65 parts by weight of 95% (by volume) ethanol, about 20 parts by weight of glacial acetic acid, and about 15 parts by weight of water, the resultant composition exhibited excellent properties as a quick-drying adhesive. In place of the 75 parts of gliadin a similar glue may be made by substituting 75 parts of hordein.

Example 10

To 4 parts by weight of zein there was added 1 part by weight of sulfonated castor oil, 95 parts by weight of the liquid water soluble N-diaminodiethylene-levulinamide. After the zein dissolved in the plasticizer the mixture was applied to rayon yarns as a size which provided such yarns with a certain amount of stiffening and served as an adhesive to hold such yarns together and further to lubricate the yarns during spinning operations. Some water may be added to the mixture during application, and the composition may be removed from the yarn by dipping it into water.

Example 11

By weight 30 parts of dibutyl-tartrate, 10 parts of liquid N-diaminodiethylene-oleamide, 5 parts of N-hydroxyethylaminoethyl-"petrex"-monoamide, 10 parts of carbon black, and 20 parts of whiting were mixed together and thoroughly ground on a roller mill. With the resultant mixture were incorporated, at room temperature, 55 parts by weight of zein acetate and about 150 parts by weight of a solvent mixture consisting of about 45 parts by weight of ethylene glycol monomethyl ether and about 105 parts by weight of isopropyl alcohol. The resultant homogeneous product was knife-coated onto a fabric base. The impregnated fabric was then baked at a temperature within the general range 170° to 180° F., for a period of about 2 hours. The resultant material was a dull black artificial leather which was suitable for embossing operations.

Example 12

Twenty grams of zein were dissolved in 50 ml. of 95% (by volume) ethyl alcohol and 18 ml. of commercial aqueous formalin (40% by volume), and the solution was treated in an autoclave at 15 lbs. steam pressure or 121° C., for 1 hour. To the solution of prolamine reaction product thus produced there was then added 10 grams of liquid N-diaminodiethylenebenzamide. Upon painting the lacquer thus produced upon tin-plate flexible clear coatings were secured which if further heated for 3 hours at a temperature above 130° C., became quite water-resistant as well as grease resistant and highly flexible.

Example 13

To 7 parts by weight of a 63 percent solids solution of the sodium salts of a sulfonated fatty acid and rosin mixture such as is secured as a by-product in sulfate paper pulp digestion, and sold as sulfonated "Indusol," there was added 74 parts by weight of water, 2 parts by weight of urea, 1 part by weight of borax, and 7 parts by weight of liquid N-aminoethyl-oleamide. There was then introduced into this solution 15 parts by weight of a de-starched, de-oiled corn gluten analyzing 73 percent protein content and 1 part by weight of lampblack, and the whole slowly heated with continuous agitation to a temperature of about 165° F. After being maintained at a temperature in the general range from 160° to 170° F., for about 2 hours, the mixture had become a smooth paste. This was rollercoated onto a piece of cotton cloth having 80 x 80 threads per inch. A stiffened fabric, exhibiting a black finish, resulted. This prepared material was eminently suited for use as a window shade cloth since it was of appropriate stiffness for such a purpose and evidenced only very slight tendencies to crack upon aging after numerous flexings. The mixture was also satisfactorily employed as an interior wall paint, preferably after adding per one part by weight thereof 0.5 part by weight of water.

Example 14

A zein dispersion in water with ammonium rosinate was prepared according to the method of Drewsen and Little (U. S. Patent No. 2,247,531) as follows: First a paste of zein and aqueous ammonia was prepared in a mechanical mixer by incorporating therein 4 parts by weight of zein, 6 parts by weight of water and 1 part by weight of aqua ammonia (26° Bé.). Then a stiff homogeneous mixture of ammonium rosinate was prepared by thoroughly mixing for several hours at an elevated temperature not in excess of 200° F., 4 parts by weight (dry basis) of paper-maker's rosin and about 1 part by weight of aqua ammonia (26° Bé.). The prepared zein paste and ammonium rosinate were then thoroughly mixed, resulting in a zein rosinate composition. There was then added to the mix thus prepared 2 parts by weight of N-aminoethyl-2-ethylhexanamide to act as a plasticizer. This substituted amide was readily dissolved into the mix. This was then employed to clay coat paper by first mixing it with a clay dispersion. A suitable clay dispersion was prepared by slurrying together 400 parts by weight of kaolin, 200 parts by weight of water and 5.5 parts by weight of sodium pyrophosphate. To 3 parts by weight of the clay slurry there was then added 1 part by weight of the plasticized zein dispersion, and the resulting coating product was screened. This material exhibited excellent qualities as a paper coater and gave claycoated paper of satisfactory adhesion and wax pick test.

The foregoing description and examples will point out that the invention is subject to numerous embodiments not herein illustrated, but falling within the scope of the appended claims.

We claim:

1. A plasticized "prolamine-base" protein composition comprising plasticized "prolamine-base" protein having as plasticizer organic carboxylic amide substituted on the nitrogen atom with at least one alkyl radical containing an amine radical selected from the group consisting of —NH₂ and =NH.

2. A plasticized "prolamine-base" protein composition comprising plasticized "prolamine-base" protein having as plasticizer organic carboxylic amide having the general formula

R—CO—N=(R'R'')

wherein R is an organic radical; wherein R' is an alkyl radical including therein an amine radical selected from the group consisting of —NH₂ and =NH; and wherein R'' is selected from the group consisting of hydrogen, R and R'.

3. A plasticized prolamine composition comprising plasticized zein having as plasticizer organic carboxylic amide substituted on the nitrogen atom with at least one alkyl radical containing an amine radical selected from the group consisting of —NH₂ and =NH.

4. A plasticized "prolamine-base" protein composition comprising plasticized prolamine-containing cereal gluten having as plasticizer organic carboxylic amide substituted on the nitrogen atom with at least one alkyl radical containing an amine radical selected from the group consisting of —NH₂ and =NH.

5. A plasticized "prolamine-base" protein composition comprising plasticized "zein-base" protein having as plasticizer organic carboxylic amide substituted on the nitrogen atom with at least one alkyl radical containing an amine radical selected from the group consisting of —NH₂ and =NH.

6. A plasticized "prolamine-base" protein composition consisting of plasticized "prolamine-base" protein having as plasticizer organic carboxylic amide substituted on the nitrogen atom with at least one alkyl radical containing an amine radical selected from the group consisting of —NH₂ and =NH.

7. A plasticized prolamine composition consisting of plasticized zein having as plasticizer organic carboxylic amide substituted on the nitrogen atom with at least one alkyl radical containing an amine radical selected from the group consisting of —NH₂ and =NH.

8. A plasticized "prolamine-base" protein composition consisting of plasticized prolamine-containing cereal gluten having as plasticized organic carboxylic amide substituted on the nitrogen atom with at least one alkyl radical containing an amine radical selected from the group consisting of —NH₂ and =NH.

9. A plasticized prolamine composition consisting of plasticized "prolamine-base" protein having as plasticizer organic carboxylic amide substituted on the nitrogen atom with at least one alkyl radical containing an amine radical selected from the group consisting of —NH₂ and =NH.

10. A "prolamine-base" protein composition comprising by weight and in homogeneous association from 5 to 95 parts of "prolamine-base" protein, and as plasticizer therefor from 95 to 5 parts of organic carboxylic amide substituted on the nitrogen atom with at least one alkyl radical containing an amine radical selected from the group consisting of —NH₂ and =NH.

11. A zein composition comprising by weight and in homogeneous association from 5 to 95 parts of zein, and as plasticizer therefor from 95 to 5 parts of organic carboxylic amide substituted on the nitrogen atom with at least one alkyl radical containing an amine radical selected from the group consisting of —NH₂ and =NH.

12. A "prolamine-base" protein coating solution comprising dissolved "prolamine base" protein, as plasticizer therefor dissolved organic carboxylic amide substituted on the nitrogen atom with at least one alkyl radical containing an amine radical selected from the group consisting of —NH₂ and =NH, and a volatile mutual solvent for said materials.

13. A "prolamine-base" protein coating solution comprising by weight from 5 to 95 parts of dissolved "prolamine-base" protein, as plasticizer therefor from 95 to 5 parts of dissolved organic carboxylic amide substituted on the nitrogen atom with at least one alkyl radical containing an amine radical selected from the group consisting of —NH₂ and =NH, and a volatile mutual solvent for said materials.

14. A zein coating composition comprising from 5 to 95 parts of dissolved zein, as plasticizer therefor from 95 to 5 parts of dissolved organic carboxylic amide substituted on the nitrogen atom with at least one alkyl radical containing an amine radical selected from the group consisting of —NH₂ and =NH, and a volatile mutual solvent for said materials.

15. A "prolamine-base" protein composition comprising by weight and in homogeneous association from 5 to 95 parts of "prolamine-base" protein, and as plasticizer therefor from 95 to 5 parts of plasticizing organic carboxylic amide having the general formula R—CO—N=(R'R'') wherein R is an organic radical; wherein R' is an alkyl radical including therein an amine radical selected from the group consisting of —NH₂ and =NH, and wherein R'' is selected from the group consisting of hydrogen, R and R'.

16. A plasticized prolamine composition comprising plasticized gliadin having as plasticizer organic carboxylic amide substituted on the nitrogen atom with at least one alkyl radical containing an amine radical selected from the group consisting of —NH₂ and =NH.

17. A plasticized prolamine composition comprising plasticized hordein having as plasticizer organic carboxylic amide substituted on the nitrogen atom with at least one alkyl radical containing an amine radical selected from the group consisting of —NH₂ and =NH.

18. A plasticized prolamine composition consisting of plasticized gliadin having as plasticizer organic carboxylic amide substituted on the nitrogen atom with at least one alkyl radical containing an amine radical selected from the group consisting of —NH₂ and =NH.

19. A plasticized prolamine composition consisting of plasticized hordein having as plasticizer organic carboxylic amide substituted on the nitrogen atom with at least one alkyl radical containing an amine radical selected from the group consisting of —NH₂ and =NH.

WILLARD L. MORGAN.
CARL R. FAELTEN.

REFERENCES CITED

The following references are of record in the file of this patent:

UNITED STATES PATENTS

| Number | Name | Date |
|---|---|---|
| 2,339,056 | Craver | Jan. 11, 1944 |
| 2,312,469 | Freund | Mar. 2, 1943 |
| 2,185,110 | Coleman | Dec. 26, 1939 |
| 2,115,716 | Hansen | May 3, 1938 |
| 1,986,854 | Reid | Jan. 8, 1935 |